United States Patent [19]

Pangonis

[11] 3,959,566

[45] May 25, 1976

[54] PROCESS FOR PREPARING POLYMERIC SURFACES TO IMPROVE ANTISTATIC AND SOIL RESISTANT PROPERTIES

[75] Inventor: William James Pangonis, West Chester, Pa.

[73] Assignee: E. I. Du Pont de Nemours and Company, Wilmington, Del.

[22] Filed: Oct. 21, 1974

[21] Appl. No.: 516,486

[52] U.S. Cl. .......................... 428/446; 106/287 S; 106/287 SE; 252/313 S; 427/387; 428/35; 428/451
[51] Int. Cl.$^2$ .................. B05D 3/02; B32B 9/04
[58] Field of Search ............ 117/138.8 F, 138.8 N, 117/138.8 UA, 138.8 E, 169 A; 252/313 S; 106/287 S, 287 SE; 427/387

[56] References Cited
UNITED STATES PATENTS

| | | | |
|---|---|---|---|
| 2,244,325 | 6/1941 | Bird | 252/313 S |
| 2,526,684 | 10/1950 | Powers et al. | 117/169 A |
| 2,527,329 | 10/1950 | Powers et al. | 117/169 A |
| 2,801,938 | 8/1957 | Iler | 117/169 A |
| 3,053,662 | 9/1962 | Mackey et al. | 96/87 A |
| 3,582,502 | 6/1971 | Farrow et al. | 117/169 A |
| 3,714,064 | 1/1973 | Vossos | 252/313 S |
| 3,754,984 | 8/1973 | Payne | 117/169 A |
| 3,835,054 | 9/1974 | Olewinski et al. | 252/313 S |

*Primary Examiner*—Harry J. Gwinnell

[57] ABSTRACT

A process for preparing the surface of a polymeric shaped article to achieve improved antistatic and soil resistant properties. The particles of an aqueous colloidal suspension of silica having sizes of about 15 to 40 angstroms are consolidated, and the suspension is thereafter aged at a pH sufficient to form a dispersion having silica aggregations of at least 20 particles each and then applied as a uniform and continuous coating.

7 Claims, No Drawings

3,959,566

PROCESS FOR PREPARING POLYMERIC SURFACES TO IMPROVE ANTISTATIC AND SOIL RESISTANT PROPERTIES

BACKGROUND OF THE INVENTION

This invention relates to silica sols and to processes for preparing the surface of polymeric articles with such sols. More particularly this invention is concerned with colloidal suspensions of very fine particles in aqueous medium of polysilicic acid in a particular aggregate which demonstrates unique antistatic and soil resistant properties when applied as a uniform and continuous coating on polymeric surfaces.

Conventional antistatic agents are usually viscous liquids or greases in their native state. Application of these agents on polymeric surfaces or on other materials may severely restrict subsequent processing of these products and limit their available end uses.

Antistatic and soil resistant characteristics may also be obtained by coating or otherwise treating articles with silica sols. This is known particularly in the manufacture and use of film products and textile fibers. These sols may be prepared by various methods the result of which is a colloidal system of what has been described as polymeric silicic acid sol. These silicic acid sols are relatively unstable due to high surface area and low average particle diameter below 5 millimicrons. To produce silica sols of long-term stability requires control of particle size and pH and the elimination of impurities.

The prior art has been concerned primarily with the development and use of stable sols highly concentrated in silica. U.S. Pat. No. 3,053,662 to Mackey et al., for example, discloses a photographic film having a coating thereon containing gelatin and an antistatic agent selected from the group consisting of hydrated silica and polymerized silicic acid. These forms of silica are faintly opalescent aqueous sols and contain between 15 and 30% colloidal silica as $SiO_2$. The diameter of the silica particles ranges from 7 to 15 millimicrons ($m\mu$), i.e., 70 to 150 angstroms.

U.S. Pat. No. 2,440,711 to Bechtold teaches the formation of polysilicic acid (hereinafter PSA) by reacting ethyl orthosilicate, ethanol and hydrochloric acid to obtain a solution containing about 15% PSA on an $SiO_2$ basis. This solution, when combined with other materials and applied as a coating, is known to improve the scratch resistance of certain polymeric surfaces such as methyl methacrylate. When this PSA solution is diluted and applied on film surfaces as a coating, improvements in the surface properties may be obtained including improved static prevention. A problem may arise, however, because the adhesion level of the PSA coating to the film substrate may be very poor.

SUMMARY OF THE INVENTION

There is provided in the present invention an improved process for preparing polymeric surfaces to improve the antistatic and soil resistant properties thereof. The process includes the steps of forming an aqueous silica sol having particle sizes in the range of about 15 to 40 angstroms, consolidating the fine particles of the sol at a pH of about 8 to 9, aging the sol at a pH in the range of about 3.5 to 6.6 for a period of time sufficient to form a dispersion having silica aggregations of at least 20 particles each, and thereafter applying the silica aggregations as a coating from an aqueous acid medium on a polymeric surface and removing the aqueous medium. The resultant coating exhibits improved adhesion and durability and yields a surface finish suitable for receiving other organic polymeric coatings.

DETAILED DESCRIPTION OF THE INVENTION

In practicing the present invention a very fine particle silica sol is prepared according to one of the various methods known in the art. In a preferred embodiment a fine particle sol can be prepared by the hydrolysis of a silicate ester such as ethyl silicate. Another source of silica derives from the use of ion exchange resin whereby sodium is removed from a solution of sodium silicate.

The ion exchange method is described in Bird, U.S. Pat. No. 2,244,325, issued June 3, 1941, and the method of hydrolyzing a silicate ester to obtain a fine particle silica sol is taught by Bechtold, U.S. Pat. No. 2,440,701, issued May 4, 1948. The details of preparing a sol from ethyl orthosilicate as the initial step in practicing a preferred embodiment of this invention are given in paragraph (A) of Example I hereinbelow. What has not been previously recognized is that a very fine particle polysilicic acid in a particular aggregate form applied and dried on a polymeric surface yields a unique combination of antistatic and soil resistant properties.

The fine particle silica sol formed in the initial step in practicing this invention has unit particle sizes in the range of about 15 to 40 angstroms. This mixture is thereafter made alkaline by controlled addition to a diluting solution of an alkali hydroxide such as sodium hydroxide or the like. In a preferred embodiment of this invention the dilution is continued until the pH of the resultant solution is between about 8 to 10, and more preferably between 8 to 9, during which the particles will consolidate. The term consolidation is used to describe the process step wherein the fine branched or ramified particles become more dense and spherical in shape. Any terminal groups left from the hydrolysis as well as any extremely small particles are usually eliminated. This step can be accomplished in about 2 to 5 minutes. The reaction is mildly exothermic and although temperature does not appear to be extremely critical, satisfactory results are obtained in the temperature range of about 5° C. to 70°C., preferably 5°C. to 45°C. Furthermore, optimum results throughout this process depend upon a good rate of mixing because the stability of silicic acid or colloidal silica with regard to gelling is closely related to pH, cf. page 45 of "The Colloidal Chemistry of Silica and Silicates" by R. K. Iler (Cornell University Press, 1955).

The mixture resulting from the consolidation step next undergoes a pH dependent aging step wherein both the viscosity of the mixture and the turbidity increase. To accomplish the aging the mixture pH is reduced to a value in the range of about 3.5 to 6.6 by the controlled addition of a mineral acid such as hydrochloric acid or the like. The most preferred range of pH during this step is about 5 to 6.4. The aggregates of silica particles formed during this critical aging period are better understood as three-dimensional networks of particles clinging together. The network or aggregate formation is measured in terms of relative viscosity which is the ratio of the mixture viscosity to that of the liquid, water. These viscosity measurements are carried out in an Ostwald viscometer at about 25°C. The silica sol formed during the initial step of this invention has a relatively viscosity of about 1.19 to 1.20 at 1% solids. After the aging step the relative viscosity should exceed 1.25 and preferably be between about 1.3 and 1.6 (for a 1% by weight colloidal silica suspension). The average agglomerates or networks should contain about 20 particles or more, and preferably 100 particles or more.

The colloidal silica suspension may be referred to as a polysilicic acid dispersion. Following the growth of the aggregates this dispersion can be stabilized by further controlled addition of a mineral acid such as hydrochloric acid so that the dispersion pH is reduced to a value in the range of about 1.5 to 3, and preferably 2 to 2.5. Polysilicic acid dispersions prepared in this way can be stable for periods of more than 6 months.

The application of the dispersion to polymeric surfaces or other surfaces can be accomplished by any one of a number of recognized means that will result in a continuous, uniform surface distribution. To obtain antistatic and soil resistant properties a minimun coating thickness is required. Depending upon the particular product and use requirements, thicknesses as low as 100 angstroms or as high as 2000 angstroms or more could be satisfactory. It has been found, however, that optimum surface resistivities are obtained when the polysilicic acid dispersion is applied to a thickness in the range of about 500 to 1200 angstroms. Furthermore, the adhesion and durability of the coating is improved by drying at a temperature in excess of 80°C.

The polysilicic acid dispersion disclosed herein can be used to treat a variety of polymeric surfaces. The preferred polymers are the condensation polymers such as polyesters, polyamides and polyimides, however, polyolefin and vinyl surfaces can also be treated. In addition, the shape of the polymeric surface does not appear to offer any difficulty in practicing the present invention. Extruded or molded items such as plastic containers and bottles are suitable for treatment.

It is also possible to blend the polysilicic acid dispersion with inorganic oxides including alumina, zirconia and tin oxides prior to surface coating. The combination should have at least 30% of PSA. The blends may include water dispersible polymers although the polymer should not be more than 30% by weight of the blend, and preferably less than 10% by weight of the blend.

Although the prior art teaches extensive uses of silica sols and polysilicic acid with polymers, nothing in the art suggests that a very fine particle polysilicic acid, formed by the process steps recited herein to produce and stabilize a particular colloidal dispersion, will yield substantially improved antistatic and soil resistant properties when applied and dried as a uniform coating on a polymeric surface. The coating can demonstrate surface resistivities as low as about $10^8$ ohms/square. If the invention is practiced with sol particles sizes substantially greater than about 40 angstroms, the surface resistivities of the coated articles tend to be substantially higher, reflecting poorer antistate properties. A practical method for making silica sols in particle sizes substantially below about 15 angstroms is not known to be available.

The particle size of a silica sol can be determined as follows: 0.75 gram of silica in sol form is placed in 150 ml. of an aqueous solution containing 30 grams of NaCl in water; the silica is titrated with 0.1N NaOH solution between a pH of 4.0 and 9.0. The number of milliliters of NaOH solution (X) is used in the following formula $$\text{particle size (inA)} = \frac{2750}{13.25X-15}$$

This invention is now illustrated by examples of certain preferred embodiments thereof.

EXAMPLE 1

A. A fine particle (i.e., 20 angstroms) silica sol stock solution is prepared according to Bechtold by:
  1. Mixing
     713 ml. absolute ethyl alcohol
     214 ml. 0.25N hydrochloric acid
     320 ml. water
  2. As the solution of (1) is continuously stirred 1279 grams of ethyl orthosilicate is added, and stirring is continued for at least 15 minutes.

B. The solution from Step (A) is made alkaline and diluted for consolidation of particles as follows:
  1. Diluting solution
     57.0 g. 0.50N sodium hydroxide
     2928 ml. water
  2. Add 198.4 g. of solution from Step (A) to the diluting solution
  3. The pH of the mix is between 8 and 9 and is allowed to stand 2 minutes at 25°C.

C. The pH of the mix from step (B) is adjusted for particle agglomeration during the aging period by adding 93.6 g. of 0.25N hydrochloric acid to the mix. This addition adjusts the pH to about 5.9, and the mix is aged for about 1 hour at 25°C.

D. Particle agglomeration is stabilized after 1 hour by the addition of 116.4 g. 0.25 N hydrochloric acid to mix of Step (C). The resultant pH is 2.2.

A biaxially oriented heat set polyethylene terephthalate film 1 mil in thickness was coated with the dispersion prepared above by applying the dispersion with a gravure roll having 165 lines per inch. The film was fed at the rate of 100 feet per minute. The coated film was dried and cured in a tower 15 feet long with air at a temperature of 120°C. The film was rolled up.

The coating thickness was about 1000A as determined by interference patterns. The film was readily wet with water on the coated side but not on the uncoated side. The initial surface resistivity was $3 \times 10^8$ ohms per square at 50% relative humidity.

EXAMPLE 2

Recorded below are the results obtained by treating the surface of a polyethylene terephthalate film with a silica sol prepared according to the process of the present invention. A silica sol having average particle sizes of about 20 angstroms was titrated to a pH of 8.5 with sodium hydroxide and allowed to stand 5 minutes. The dispersion was then further titrated to a pH of 5.8 with hydrochloric acid and aged for 1 hour. The dispersion was thereafter stabilized by addition of hydrochloric acid to a pH of 2.2, and the concentration was adjusted to 1% by weight of silica for application.

The film was hand dipped into the dispersion and dried in an air oven for 3 minutes at 120°C. In this example the film sample had a coating thickness of about 2000 angstroms.

TABLE

| | |
|---|---|
| Particle Size (Angstroms) | 20 |
| Concentration for Aging Step | 1% |
| Aging time at pH 5.8 | 1 hr. |
| Initial Resistivity at 50% Rel. Hum. (ohms/square) | $10^8$–$10^9$ |
| Resistivity at Rel. Hum. of 20% after 24 hrs. | $10^{10}$ |
| Ambient, 15–50% Rel. Hum. 1 month | $5 \times 10^{11}$ |
| 50% Rel. Hum.- Rehumidify after 1 month | $10^8$ |

Surface resistivity was measured in accordance with standard test procedures ASTM D-257.

What is claimed is:

1. In a method of preparing the surface of a polymeric shaped article to improve the antistatic and soil resistant properties thereof comprising the steps of:
   a. forming an aqueous silica sol having particle sizes in the range of about 15 to 40 angstroms,
   b. applying the silica as a coating from an aqueous medium on the surface of said article, and
   c. removing the aqueous medium; wherein the improvement comprises:
      1. consolidating the fine particles of said silica sol formed in step (a) at a pH of about 8 to 9, and
      2. aging the sol resulting from said consolidation step at a pH in the range of about 3.5 to 6.6 for a period of time sufficient to form a dispersion having silica aggregations of at least 20 particles each.

2. The method as defined in claim 1 wherein the article is polymeric film.

3. The method as defined in claim 1 wherein the aging step is carried out at a pH of about 5 to 6.4.

4. The method as defined in claim 3 including the additional step of stabilizing the dispersion after the aging period by adjusting the pH thereof to about 2.2 to 3.

5. The method as defined in claim 1 wherein the consolidation step (1) is carried out at a temperature in the range of 5°C. to 45°C.

6. The method as defined in claim 1 wherein the sol resulting from the aging step (2) has a relative viscosity between about 1.3 and 1.6, for a 1% by weight colloidal suspension.

7. A polymeric film having at least one surface thereof prepared according to the method of claim 1.

* * * * *